UNITED STATES PATENT OFFICE.

GEORG CLEMENS SCHNEIDER, OF FREIBERG, GERMANY, ASSIGNOR TO EUGEN ABRESCH, OF NEUSTADT a. d. HAARDT, GERMANY.

PROCESS OF LEACHING COPPER ORES.

932,643.   Specification of Letters Patent.   Patented Aug. 31, 1909.

No Drawing.   Application filed February 4, 1909.   Serial No. 476,074.

*To all whom it may concern:*

Be it known that I, GEORG CLEMENS SCHNEIDER, mining councillor, chief of the Royal Metallurgical Laboratory, a subject of the German Emperor, and resident of Freiberg, Germany, with the post-office address Parkstrasse No. 300, have invented new and useful Improvements in Processes of Leaching Copper Ores, of which the following is a specification.

Up to the present no method exists of profitably leaching calcereous low-grade copper ores either consisting of oxids alone or of oxids and sulfids of that metal. The ordinary acid process of extraction is far too unprofitable, and the same applies to the use of salts of iron, and other methods. Moreover, the repeatedly advocated and investigated extraction with ammonia and ammonia salts has no prospect of success in practice, even if only from the fact that the apparatus is very large, complicated and expensive when anything like a large quantity has to be treated.

It has now been ascertained that even a dilute solution of potassium hydroxid or sodium hydroxid is sufficient to convert the natural carbonates of copper (malachite and azurite) into copper hydroxid. This hydroxid, however, is well known to be soluble in various organic substances, such for example as tartrates, grape sugar, saccharose and glycerin. Hence the copper can be extracted from copper carbonate ores, by treating the same with a dilute solution of one of these organic substances in presence of caustic soda; and if the ores be crushed sufficiently fine the process of solution will go on even in the cold, though it is accelerated by the gentle application of heat (a temperature of 40-50° C.).

In this operation tartrates dissolve a little lime as well, though not much; sugar exhibits a slightly diminished solvent power, while glycerin has proved to be the most suitable, as also with regard to the regeneration of the liquors. Thus for example, a solution of 10 kilos of caustic soda and 10 liters glycerin in 100 liters of water, is found to extract approximately 66 kilos of a low-grade copper oxid ore containing 2.75% of copper and about 20% of carbonates of lime and magnesia, in about 8 hours at 50° C. to such an extent that only 0.4-0.5% of copper is left behind, while none of the lime or magnesia passes into solution. Calcined cupric oxid is also soluble in this liquid and consequently so are malachite, azurite and red copper ore that have been converted into cupric oxid by heating. The same applies to copper sulfid roasted at dull red heat. Hence, after a short preliminary roasting even calcareous ores can be extracted that contain red copper ore, copper glance, copper pyrites or variegated copper ore, either alone or in presence of malachite or azurite, particularly since both lime and ferric oxids are insoluble in the liquor.

The recovery of copper from the liquor is most cheaply and suitably effected by electrolysis and not by special chemical reagents. By these means a copper rich in cupric oxid is obtained on the cathodes, and is invariably accompanied by the precipitation of cuprous oxid equivalent to about 10% of the copper. Both can be smelted in presence of a small amount of coal, and after a brief process of fining can be run into molds.

The regeneration of the solution which contains a quantity of sodium carbonate corresponding with the carbon dioxid contents of the copper carbonate, is effected by the addition of a sufficient quantity of caustic soda to restore the 10% originally present. When the liquor has gradually become so rich in sodium carbonate that the latter separates out as crystals during the cooling down of the solution (previous to the electrolysis) the solvent power toward copper is nevertheless undiminished, while on the other hand no lime then passes into solution.

Now what I claim and desire to secure by Letters Patent is the following:

1. A process for leaching calcareous copper ores which consists in treating the said ores with a solution of caustic alkali, in presence of organic substances that are capable of dissolving cupric hydroxid substantially as described.

2. A process for leaching copper ores which consists in treating the said ores after a previous roasting with a solution of caustic alkali in presence of organic substances that are capable of dissolving cupric hydroxid substantially as described.

3. A process for leaching copper ores which consists in treating the said ores with a dilute solution of caustic soda in presence of glycerin substantially as described.

4. A process for leaching copper ores which consists in treating approximately 66 kilos of said ores with a solution of about 10 kilos caustic soda, 10 liters glycerin and 100 liters water substantially as described.

In testimony, that I claim the foregoing as my invention, I have signed my name in presence of two witnesses, this 19th day of January, 1909.

GEORG CLEMENS SCHNEIDER.

Witnesses:
FRIEDRICH KOLBECK,
MARTIN HENGLEIN.